United States Patent [19]
Wiemers et al.

[11] Patent Number: 5,894,888
[45] Date of Patent: Apr. 20, 1999

[54] HORIZONTAL WELL FRACTURE STIMULATION METHODS

[75] Inventors: Timothy O. Wiemers, Hondo, Tex.; Walter B. Hill, Norman; William V. Grieser, Yukon, both of Okla.

[73] Assignees: Chesapeake Operating, Inc, Oklahoma City; Halliburton Energy Services, Inc., Duncan, both of Okla.

[21] Appl. No.: 08/915,784

[22] Filed: Aug. 21, 1997

[51] Int. Cl.$^6$ ............................................. E21B 47/00
[52] U.S. Cl. .................. 166/250.1; 166/50; 166/281; 166/308
[58] Field of Search ................................ 166/30, 250.1, 166/271, 281, 305.1, 308

[56] References Cited

U.S. PATENT DOCUMENTS

| | | | |
|---|---|---|---|
| 5,074,359 | 12/1991 | Schmidt | 166/308 X |
| 5,074,360 | 12/1991 | Guinn | 166/308 X |
| 5,103,911 | 4/1992 | Heijnen | 166/308 X |
| 5,358,047 | 10/1994 | Himes et al. | 166/309 X |
| 5,472,049 | 12/1995 | Chaffee et al. | 166/308 X |
| 5,482,116 | 1/1996 | El-Rabaa | 166/308 X |
| 5,598,891 | 2/1997 | Snider et al. | 166/308 |
| 5,775,426 | 7/1998 | Snider et al. | 166/308 |

*Primary Examiner*—Roger Schoeppel
*Attorney, Agent, or Firm*—Robert A. Kent; Clark Dougherty, Jr.

[57] ABSTRACT

The present invention relates to improved methods of forming spaced fractures in a subterranean zone penetrated by a horizontal well bore. The methods include the steps of placing an open ended solid liner in the horizontal well bore, pumping a fracturing fluid through the open end of the liner to create fractures in the zone adjacent to the open end, forming perforations in the liner at a selected position spaced from the previously created fractures and pumping a fracturing fluid through the perforations to create additional fractures in the zone.

19 Claims, 3 Drawing Sheets

HORIZONTAL WELL FRACTURE STIMULATION METHODS

BACKGROUND OF THE INVENTION

1. Field of the Invention

The present invention relates to improved methods of forming spaced fractures in a subterranean zone penetrated by a horizontal well bore.

2. Description of the Prior Art

Subterranean hydrocarbon containing formations penetrated by well bores are commonly stimulated by creating fractures therein. That is, a fracturing fluid such as a gelled aqueous fluid is pumped into the formation at a rate and pressure such that fractures are created and extended therein. A propping material such as sand is typically deposited in the fractures so that they are prevented from completely closing when the formation is returned to production and provide flow passages through which hydrocarbons readily flow to the well bore.

Subterranean formations are also commonly treated with aqueous acid solutions to stimulate the production of hydrocarbons therefrom. One such treatment known as "fracture-acidizing" involves the formation of one or more fractures in the formation and the introduction of an aqueous acid solution into the fractures to etch the fracture faces whereby flow channels are formed when the fractures close. The aqueous acid solution also enlarges the pore spaces in the fracture faces which increases production of hydrocarbons into the flow channels.

In carrying out fracturing and fracture-acidizing treatments in subterranean formations penetrated by open hole horizontal well bores, sealing mechanisms such as one or more packers have been utilized to isolate spaced portions of the formations along the horizontal well bores so that a plurality of spaced fractures can be formed therein. However, such sealing mechanisms are often incapable of containing the fracturing fluid utilized at the required fracturing pressure. Even when the sealing mechanisms are capable of isolating a formation to be fractured, the use and installation of the sealing mechanisms are time consuming and add considerable expense to the fracturing process.

It has been the more recent practice in wells containing open hole horizontal well bores, particularly in sandstone and carbonate formations, to dispense with the use of sealing mechanisms and to pump aqueous fracturing fluids with or without acids into the horizontal open hole sections at high rates. In this process, the fracturing fluid creates fractures in an uncontrolled manner with the largest volume of the fracturing fluid generally entering one or more fractures close to the point of entry of the fracturing fluid into the horizontal well bore. Consequently, only a few fractures are often formed in the well bore with very few or none being formed along the length of the well bore.

Thus, while the recently utilized fracturing procedure is of low cost, can be performed rapidly and allows the rapid flow back of fluids after fracturing, the procedure often does not result in as great an increase in hydrocarbon production as would be the case if the fractures were spaced along the length of the horizontal well bore in the producing formation. Therefore, there is a need for improved methods of fracturing subterranean formations penetrated by open hole horizontal well bores. Further, there is a need for such improved methods whereby a plurality of spaced fractures can be produced along the length of an open hole horizontal well bore in a subterranean formation without using sealing mechanisms. Further, there is a need for such methods which are relatively economical, can be rapidly performed and allow the rapid flow back of fluids after the fracturing procedure.

SUMMARY OF THE INVENTION

The present invention provides improved methods of forming spaced fractures in a subterranean formation penetrated by an open hole horizontal well bore which meet the needs described above and overcome the deficiencies of the prior art. The methods basically comprise the steps of placing an open ended uncemented solid liner in the horizontal well bore and then pumping a fracturing fluid through the liner and through the open end thereof at a rate and pressure sufficient to create and extend one or more fractures in the formation adjacent to the open end. Thereafter, perforations are formed in the liner at a selected position spaced a distance from the one or more previously created fractures and a fracturing fluid is pumped through the perforations to create and extend one or more additional fractures in the formation adjacent to the perforations. Additional spaced fractures are created along the length of the liner and the horizontal well bore by repeating the steps of forming perforations in the liner at a selected position spaced a distance from the previously created fractures and pumping a fracturing fluid through the perforations to create and extend fractures in the formation adjacent to the perforations.

Sealing mechanisms are not utilized to isolate the spaced perforations as the spaced fractures are produced. Instead, at each fracture location a fracturing fluid is pumped at a high rate and pressure whereby the formation adjacent to the perforations is fractured and the loss of fracturing fluid into the previously created fractures is small due to the pressure drop along the length of the liner between the perforations and the previously created fractures.

It is, therefore, a general object of the present invention to provide improved methods of forming spaced fractures in a subterranean formation penetrated by an open hole horizontal well bore.

Other and further objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

As mentioned, the present invention provides improved methods of forming spaced fractures in a subterranean zone comprised of one or more subterranean formations penetrated by a horizontal well bore without the use of sealing mechanisms such as packers or the like. The term "horizontal well bore" is used herein to mean a well bore which penetrates one or more subterranean formations and is deviated from vertical. The methods of this invention also avoid the uncontrolled creation of fractures which occurs in a horizontal open hole well bore when a fracturing fluid is pumped into the well bore at a high rate. Instead, the methods of the present invention produce fractures along the length of the well bore which are spaced from each other at selected distances.

Figure 1:
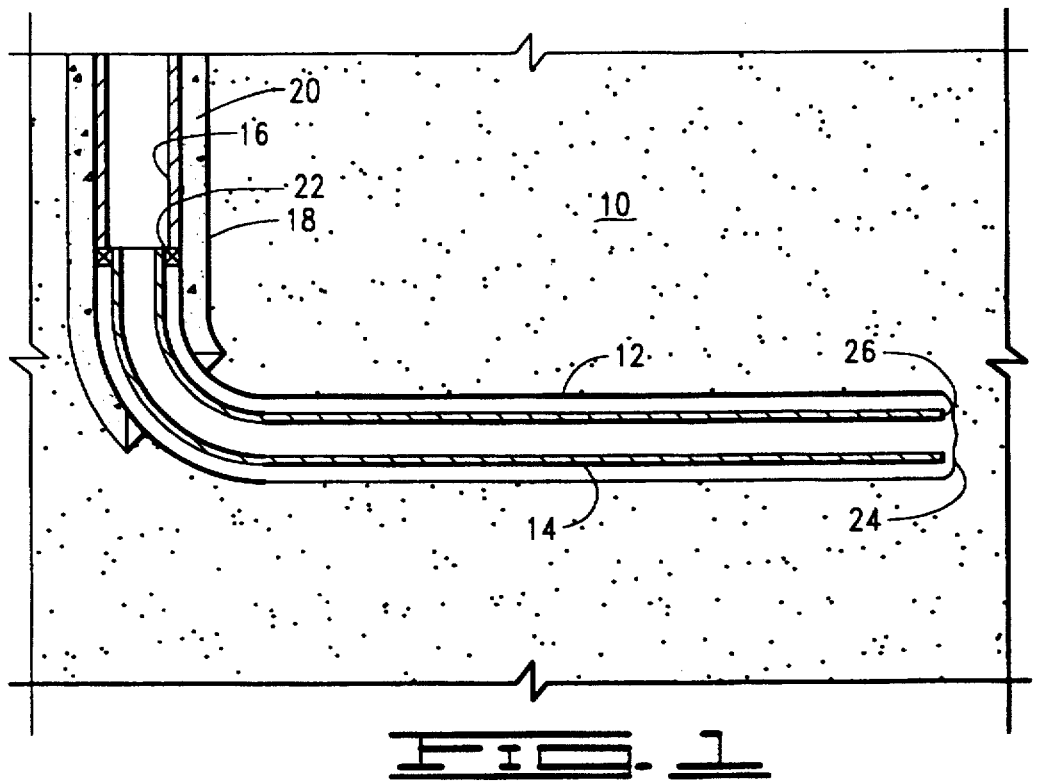
FIG. 1 is a schematic side view of a subterranean formation having a horizontal open hole well bore therein and a solid liner placed in the well bore.

Referring now to the drawings and particularly to FIG. 1, a subterranean formation 10 is illustrated penetrated by a horizontal open hole well bore 12. Typically, the formation 10 is formed of sandstone or carbonate and contains hydrocarbons in the form of oil, gas or both. In accordance with the methods of the present invention, an uncemented solid liner 14 having an open end is placed in the horizontal well bore 12. The term "solid liner" is used herein to mean a relatively small diameter liner without slots or other similar openings therein, e.g., a 4½ inch solid liner. Typically, one end of the liner is hung from a larger diameter casing 16 which may or may not be bonded to the walls of a well bore 18 by a cement sheath 20. The end of the liner 14 within the casing 16 is usually sealed to the casing 16 by a conventional high pressure packer 22. However, if desired or required, other sealing means can be used or the liner 14 may be continuous and extend to the surface. As shown, the liner 14 extends through the horizontal open hole well bore 12 to a point where the deepest fracture is to be formed, generally within about 1000 feet or nearer to the end 24 of the well bore 12. The liner is not cemented or otherwise bonded to the walls of the well bore 12. The end 26 of the liner 14 closest to the end 24 of the well bore 12 is open. That is, the terms "open" or "open ended" are used herein to mean that the liner 14 can be open ended as shown in the drawings, the end 26 can be closed with one or more openings or perforations formed in the liner adjacent thereto or a full opening guide shoe or the equivalent can be attached thereto.

Figure 2:
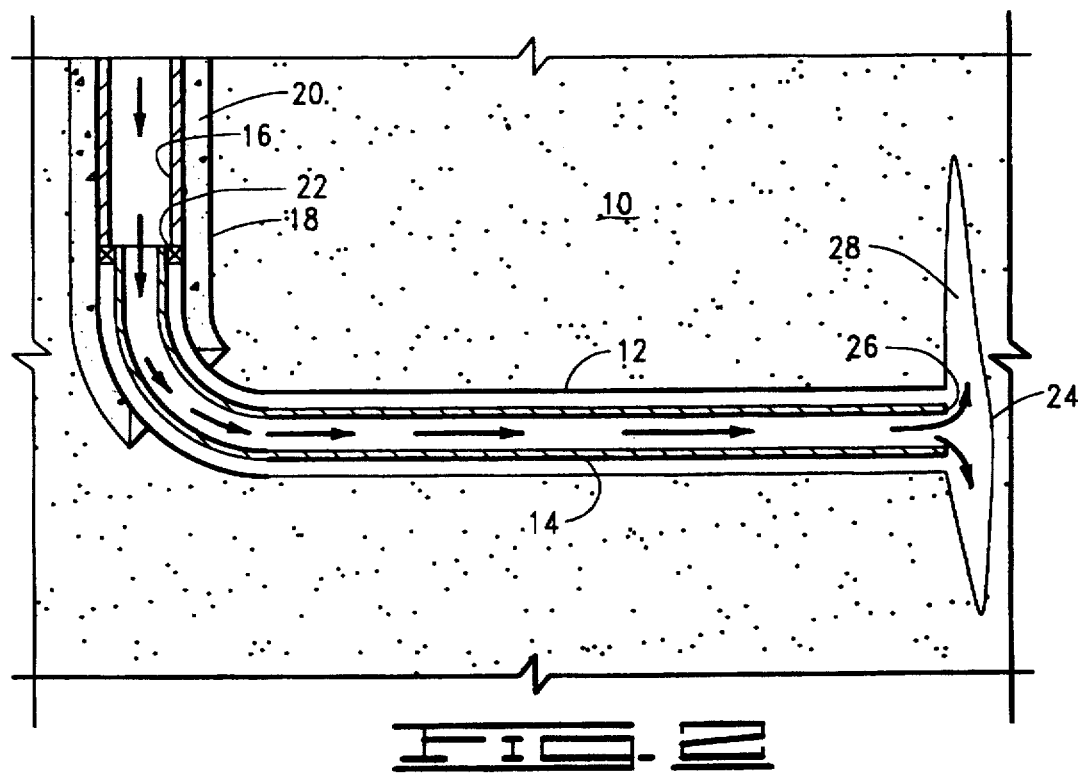
FIG. 2 is a view similar to FIG. 1 showing the formation after a fracturing fluid has been pumped into the formation and fractures have been created therein adjacent the open end of the liner.

Referring now to FIG. 2, once the solid liner 14 has been placed within the well bore 12 as described above, as shown by the arrows in FIG. 2 a fracturing fluid is pumped through the casing 16 in the well bore 18, through the solid liner 14 and through the open end 26 thereof into the well bore 12 at a rate and pressure sufficient to create and extend one or more fractures in the formation 10. As a result, a fracture 28 is created and extended in the formation 10 adjacent to the open end 26 of the liner 14.

Figure 3:
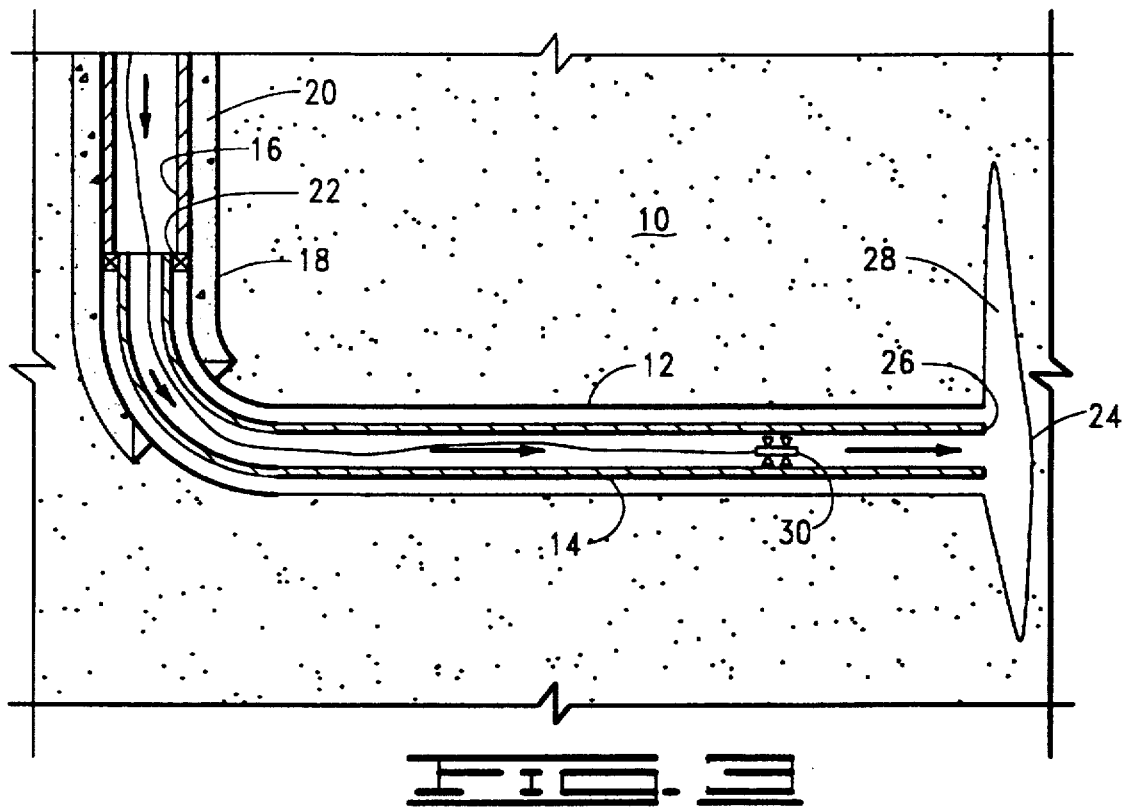
FIG. 3 is a view similar to FIG. 2 showing the formation after a wire line perforating gun has been pumped to a selected position within the solid liner.

Referring now to FIG. 3, after the fracture 28 has been created and extended, the pumping of the fracturing fluid is terminated and a conventional perforating gun 30 is moved into and through the liner 14 to a selected position spaced a desired distance from the previously created fracture 28. The perforating gun 30 is then operated whereby perforations 32 (shown in FIG. 4) are formed through the solid liner 14. The perforating gun 30 can take a variety of conventional forms. In the form shown in the drawings, the perforating gun 30 is illustrated as a wire line operated perforating gun which is pumped into and through the liner 14. Other forms or perforating guns known to those skilled in the art can also be used such as tubing conveyed perforating guns, coiled tubing conveyed perforating guns, etc. Other means of forming openings in the liner 14 can also be used such as a hydrojet cutting tool.

Figure 4:
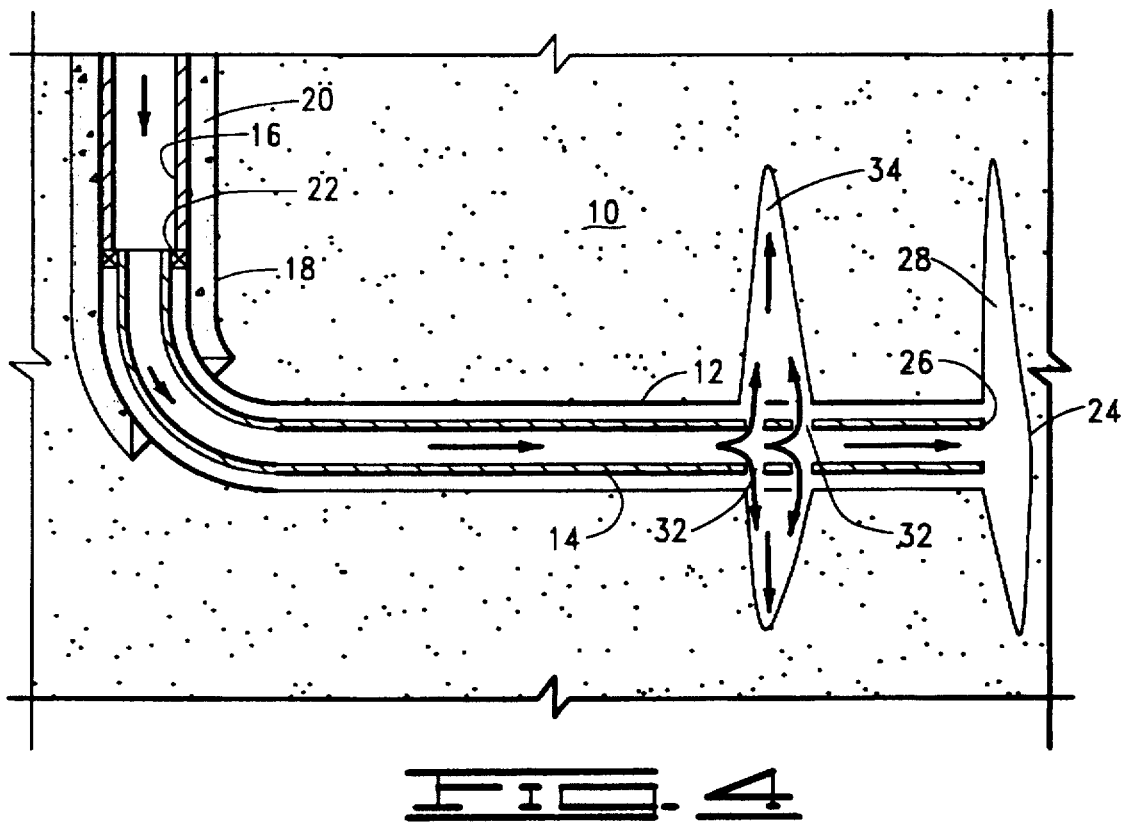
FIG. 4 is a view similar to FIG. 3 showing the formation after the perforating gun has been operated and a fracturing fluid has been pumped through the perforations to create additional fractures in the formation adjacent the perforations.

Referring now to FIG. 4 and as shown by the arrows therein, a fracturing fluid is again pumped through the casing 16, through the solid liner 14 and through the perforations 32 at a rate and pressure sufficient to create and extend one or more additional fractures in the formation 10. As a result, a fracture 34 is created and extended in the formation 10 as illustrated in FIG. 4 which is spaced a desired distance from the previously created fracture 28.

Figure 5:
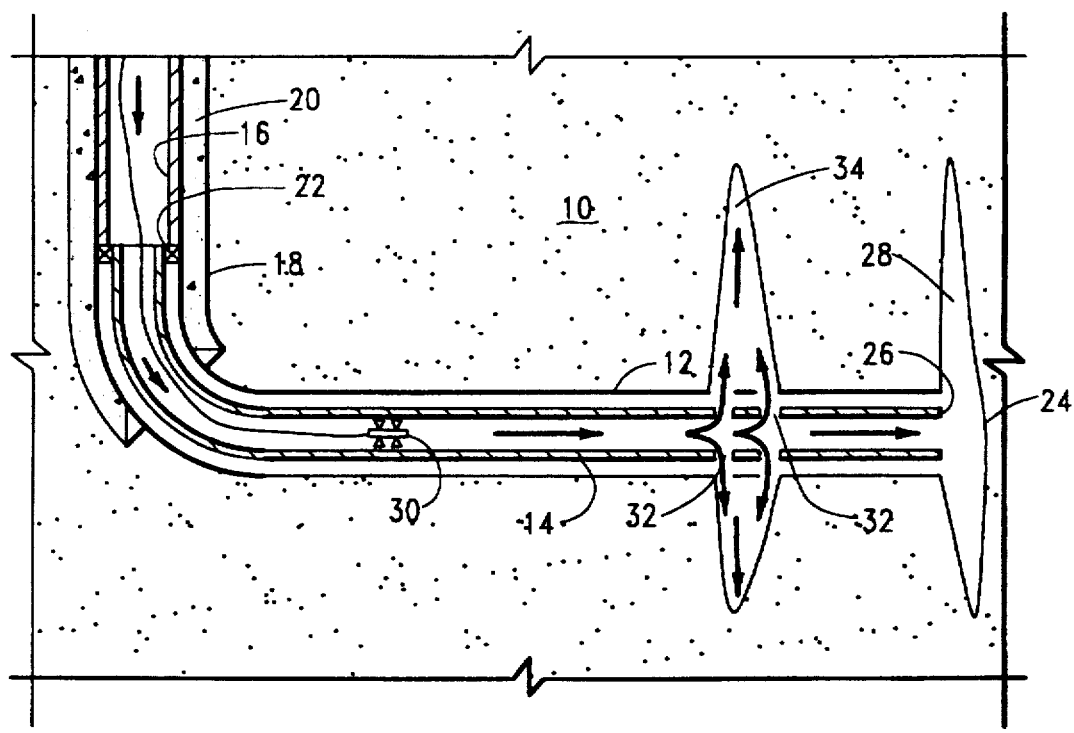
FIG. 5 is a view similar to FIG. 4 showing the formation after a second wire line operated perforating gun has been pumped to a selected position within the solid liner.

As shown in FIG. 5, a second conventional wire line operated perforating gun 36 is next pumped through the solid liner 14 to a second selected position therein spaced a desired distance from the previously created fracture 34. The perforating gun 36 is operated to form perforations 38 (shown in FIG. 6) through the solid liner 14 into the formation 10.

Figure 6:
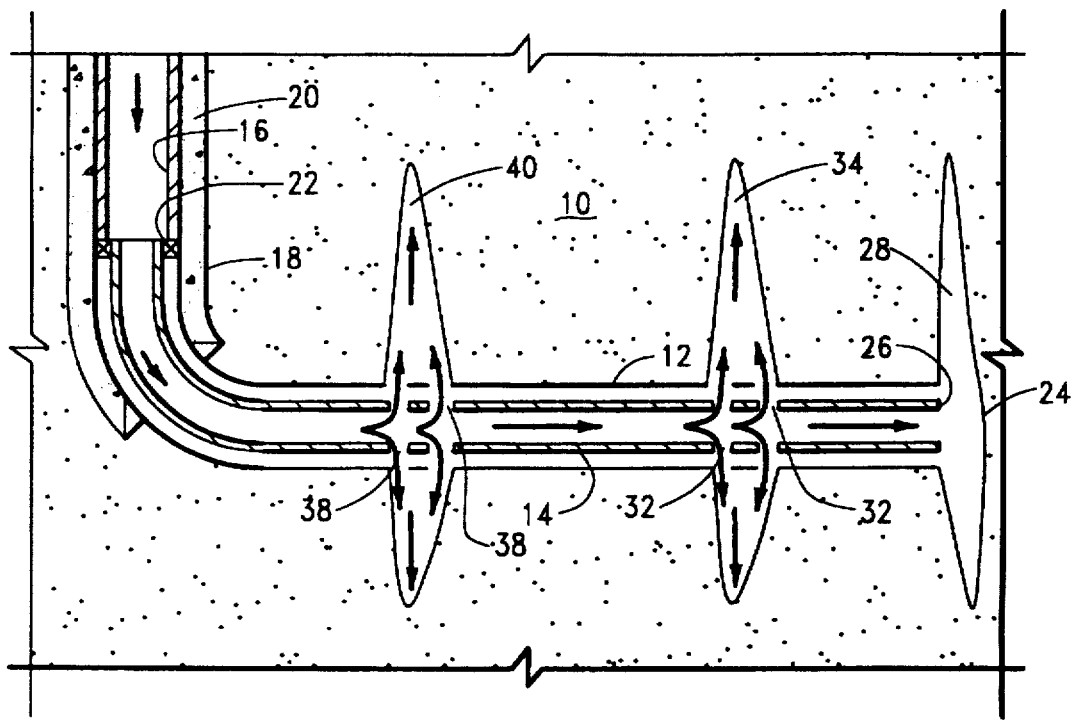
FIG. 6 is a view similar to FIG. 5 showing the formation after the second perforating gun has been operated and a fracturing fluid has been pumped through the perforations to create additional fractures in the formation adjacent the perforations.

Referring now to FIG. 6 and as shown by the arrows therein, a fracturing fluid is pumped through the casing 16, through the solid liner 14 and through the perforations 38 at a rate and pressure sufficient to create and extend one or more fractures in the formation 10. As a result, a third fracture 40 is formed in the formation 10 adjacent to the perforations 38 which is spaced at a desired distance from the previously created fracture 34.

As will now be understood, the steps of forming perforations in the solid liner and pumping a fracturing fluid through the formed perforations to create one or more fractures are repeated as many times as is necessary to produce the desired number of spaced fractures or sets of fractures extending from the horizontal well bore 12. Sealing mechanisms such as packers are not needed to isolate the previously formed fracture or fractures during the formation of the additional fracture or fractures as a result of the relatively small diameter of the solid liner utilized. That is, the fracturing fluid is pumped through the liner at a high rate whereby a large pressure drop in the fracturing fluid takes place between fracture locations. This in turn causes most of the fracturing fluid to enter the perforations at the location of the new fracture or fractures being formed with only a relatively small amount of the fracturing fluid flowing into the previously formed fracture or fractures.

For example, in a typical arrangement and still referring to FIG. 6, the cemented casing 16 is a 7⅝ inch casing and the solid liner 12 is a 4½ inch liner. The spacing between the fractures 28, 34 and 40 can vary widely depending upon the particular type of formation being fractured and other factors known to those skilled in the art. For a carbonate formation, the spacing is typically in the range of from about 500 feet to about 1000 feet. Also, for a carbonate formation, an aqueous acid solution containing about 15% by weight hydrochloric acid is pumped through the liner 12 at a rate of from about 100 to about 200 barrels per minute which exerts a pressure on the formation 10 by way of the open end 26 of the liner 14 which is equal to or greater than the fracture gradient of the formation, e.g., a pressure in the range of from about 4000 psig to about 6000 psig. As a result, a fracture 28 is created and extended in the formation 10. After the formation of the perforations 32 spaced at a distance in the range of from about 500 feet to about 1000 feet from the fracture 28, the above described fracturing fluid is pumped to and through the perforations 32 at a rate of about 200 barrels per minute which exerts a pressure on the formation 10 of about 6000 psig causing the fracture 34 to be formed and extended therein. During the pumping of the fracturing fluid through the perforations 32, some of the fracturing fluid flows through the liner 14 and through the open end 26 thereof. However, a pressure drop of about 1600 psig is experienced by the fluid as it flows through the liner 14 to the open end 26 thereof whereby only about 24% by volume of the fracturing fluid being pumped flows into the fracture 28 while the fracture 34 is being created and extended.

A variety of fracturing fluids can be utilized in accordance with the present invention including gelled or non-gelled aqueous fluids, oil based fluids, foams and emulsions. As mentioned, when the formation being fractured is a carbonate or other formation susceptible to acidizing treatments, the fracturing fluid can be an aqueous acid solution, i.e., a solution of water and one or more acids. In other fracturing applications, the fracturing fluid can be an aqueous or other suitable fracturing fluid known to those skilled in the art. Aqueous fracturing fluids with or without acids are generally preferred for use in accordance with this invention.

The water used to form an aqueous fracturing fluid can be any aqueous fluid which does not adversely react with other components of the fracturing fluid. For example, the water can be fresh water, brines, salt solutions and the like.

When the fracturing fluid is an aqueous acid solution, the acid is preferably selected from the group consisting of hydrochloric acid, hydrofluoric acid, formic acid, acetic acid, citric acid, glycolic acid and mixtures thereof. The acid is preferably present in an amount in the range of from about 1% to about 28% by weight of the acid solution, more preferably from about 5% to about 15%. As will be understood by those skilled in the art, the aqueous acid solution can include a variety of additives such as metal corrosion inhibitors, corrosion inhibitor intensifiers, sulfide scavengers, solvents, surfactants and other components commonly used in acidizing compositions.

When the fracturing fluid is an aqueous fluid with or without acid, it typically includes one or more additives for increasing the viscosity of the fracturing fluid which lowers fluid loss, increases the ability of the fluid to carry propping agent such as sand and increases the friction pressure of the fluid to thereby create a higher pressure drop as the fluid is pumped through the solid liner utilized. For example, viscosity increasing additives such as gelling agents, crosslinkers and the like as well as gel breakers can be included in the fracturing fluid.

A variety of gelling agents can be utilized including hydratable polymers which contain one or more functional groups such as hydroxyl, cis-hydroxyl, carboxyl, sulfate, sulfonate, amino or amide. Particularly useful such polymers are polysaccharides and derivatives thereof which contain one or more of the monosaccharide units galactose, mannose, glucoside, glucose, xylose, arabinose, fructose, glucuronic acid or pyranosyl sulfate. Natural hydratable polymers containing the foregoing functional groups and units include guar gum and derivatives thereof, locust bean gum, tara, konjak, tamarind, starch, cellulose and derivatives thereof, karaya, xanthan, tragacanth and carrageenan. Hydratible synthetic polymers and copolymers which contain the above mentioned functional groups and which have been utilized heretofore include polyacrylate, polymethacrylate, polyacrylamide, maleic anhydride, methylvinyl ether polymers, polyvinyl alcohol, polyvinylpyrrolidone and graft polymers such as graft hydroxyethylcellulose polymers.

The preferred gelling agents for use in accordance with this invention are hydratible polysaccharide polymers selected from the group of hydroxyethylcellulose, carboxymethylcellulose, carboxymethylhydroxyethylcellulose, hydroxyethylcellulose grafted with various compounds to provide desired properties, guar, hydroxypropylguar and carboxymethylhydroxypropylguar, with guar being the most preferred. Generally, the gelling agent used is combined with the water used in an amount in the range of from 0.06% to about 1.1% by weight of the water.

Examples of crosslinking agents which can be utilized to further increase the viscosity of the gelled fracturing fluid are multivalent metal salts or other compounds which are capable of releasing multivalent metal ions in an aqueous solution. Examples of the multivalent metal ions are chromium, zirconium, antimony, titanium, iron (ferrous or ferric), zinc or aluminum. When used, the cross-linking agent is added to the gelled water in an amount in the range of from about 0.12% to about 0.6% by weight of the water.

The above described gelled or gelled and crosslinked fracturing fluids typically also include gel breakers such as those of the enzyme type, the oxidizing type or the acid buffer type which are well known to those skilled in the art. The gel breakers cause the viscous fracturing fluids to revert to thin fluids that can be produced back to the surface after they have been used to fracture a subterranean formation or zone.

The aqueous fracturing fluids can also include one or more of a variety of well known additives such as gel stabilizers, fluid loss control additives, clay swelling reducing additives (clay stabilizers), bactericides and the like.

In order to further illustrate the methods of this invention, the following example is given.

EXAMPLE

A horizontal well having a vertical cased well bore having 7⅝ inch casing cemented therein extends to a depth of 8,840 feet. An open hole well bore extends below the casing an additional vertical depth of 300 feet and then horizontally through a hydrocarbon producing formation for a distance of 4,865 feet. The total length of the vertical and horizontal portions of the well bore is 13,700 feet.

The producing formation is stimulated by a fracture-acidizing procedure of the present invention. That is, a 4½ inch, 15.1 pound solid liner is run into the horizontal portion of the well bore and is not cemented or otherwise fixed to the walls of the well bore. The liner includes a full opening guide shoe at the end thereof which is positioned within about 400 feet from the end of the horizontal well bore. The top end of the liner is hung from the 7⅝ inch casing and sealed thereto with a 10,000 psi packer.

A multi-stage fracture-acidizing procedure is performed by pumping 72 barrels of a 15% by weight aqueous hydrochloric acid solution through the end of the liner at a rate of about 127 barrels per minute. A pressure of about 6200 psig is exerted on the formation adjacent to the end of the liner whereby one or more fractures are created and extended therein. A wireline operated perforating gun is then pumped into and through the liner to a selected position therein within the interval of about 12,020 feet to about 12,540 feet, i.e., about 1,000 feet from the previously produced fractures adjacent to the open end of the liner. The perforating gun is operated whereby perforations are produced in the liner and the above-described fracturing fluid is again pumped through the liner and through the perforations at a rate of about 146 barrels per minute which creates and extends one or more additional fractures in the formation adjacent to the perforations. During the fracturing process, 4000 barrels of the above-described aqueous acid solution are pumped.

The perforating and fracturing procedure described above is repeated whereby two additional sets of fractures are formed which are spaced from each other along the length of the horizontal well bore. During the third fracturing stage, about 7200 barrels of fracturing fluid are pumped at a rate of 184 barrels per minute, and during the fourth fracture stage about 9400 barrels of fracturing fluid are pumped at a rate of about 210 barrels per minute. Upon completion of the fracturing procedure, the well is flowed back at a high rate whereby it is cleaned up. Immediately thereafter the well is placed on production.

Thus, the present invention is well adapted to carry out the objects and attain the ends and advantages mentioned as well as those inherent therein. While numerous changes may be made by those skilled in the art, such changes are encompassed within the spirit of this invention as defined by the appended claims.

What is claimed is:

1. An improved method of forming spaced fractures in a subterranean formation penetrated by a horizontal well bore comprising the steps of:
   (a) placing an open ended solid liner in said horizontal well bore;
   (b) pumping a fracturing fluid through said liner and through said open end thereof at a rate and pressure sufficient to create and extend one or more fractures in said formation adjacent to said open end;
   (c) forming one or more openings in said liner at a selected position spaced a distance from said one or more previously created fractures; and
   (d) pumping a fracturing fluid through said liner and through said openings at a rate and pressure sufficient to create and extend one or more additional fractures in said formation adjacent to said openings.

2. The method of claim 1 which further comprises repeating steps (c) and (d).

3. The method of claim 1 wherein said openings are formed in accordance with step (c) using a perforating gun.

4. The method of claim 1 wherein said fracturing fluids of steps (b) and (d) are selected from the group of gelled or non-gelled aqueous fluids, oil based fluids, foams and emulsions.

5. The method of claim 1 wherein said fracturing fluids of steps (b) and (d) each comprise an aqueous fluid.

6. The method of claim 5 wherein at least one of said aqueous fluids is an aqueous acid solution and the acid in said aqueous acid solution is selected from the group of hydrochloric acid, hydrofluoric acid, formic acid, acetic acid, citric acid and mixtures thereof.

7. The method of claim 6 wherein said acid is present in said aqueous acid solution in an amount in the range of from about 1% to about 28% by weight of said aqueous acid solution.

8. The method of claim 1 wherein at least one of said fracturing fluids of steps (b) and (d) comprise water.

9. The method of claim 8 wherein said water is selected from the group of fresh water, brine and aqueous salt solutions.

10. An improved method of forming spaced fractures in a subterranean producing zone penetrated by an open hole horizontal well bore comprising the steps of:
    (a) placing an open ended solid liner in said horizontal well bore;
    (b) pumping a fracturing fluid through said liner and through said open end thereof at a rate and pressure sufficient to create and extend one or more fractures in said zone adjacent to said open end;
    (c) forming perforations in said liner at a selected position spaced a distance from said one or more previously created fractures;
    (d) pumping a fracturing fluid through said liner and through said perforations at a rate and pressure sufficient to create and extend one or more additional fractures in said zone adjacent to said perforations; and
    (e) repeating steps (c) and (d) one or more times.

11. The method of claim 10 wherein said perforations are formed in accordance with step (c) using a wire line operated perforating gun.

12. The method of claim 10 wherein said fracturing fluids of steps (b) and (d) each comprise an aqueous fracturing fluid.

13. The method of claim 11 wherein at least one of said fracturing fluids is an aqueous acid solution and said acid is selected from the group of hydrochloric acid, hydrofluoric acid, formic acid, acetic acid, citric acid and mixtures thereof.

14. The method of claim 13 wherein the water in said aqueous acid solution is selected from the group of fresh water, brine and aqueous salt solutions.

15. The method of claim 14 wherein said acid is present in said solution in an amount in the range of from about 1% to about 28% by weight of said solution.

16. An improved method of forming a plurality of spaced fractures in a subterranean producing zone penetrated by an open hole horizontal well bore comprising the steps of:
    (a) placing an open ended solid liner in said horizontal well bore;
    (b) pumping a fracturing fluid selected from the group of gelled or non-gelled aqueous fluids, oil based fluids, foams and emulsions through said liner and through said open end thereof at a rate and pressure sufficient to create and extend one or more fractures in said zone adjacent to said open end;
    (c) pumping a wire line operated perforating gun into and through said liner until said perforating gun reaches a selected position spaced a distance from said one or more previously created fractures;
    (d) operating said perforating gun to thereby form perforations in said liner;
    (e) pumping a fracturing fluid selected from the group of gelled or non-gelled aqueous fluids, oil based fluids, foams and emulsions through said liner and through said perforations at a rate and pressure sufficient to create and extend one or more additional fractures in said zone adjacent to said perforations; and
    (f) repeating steps (c), (d) and (e) one or more times.

17. The method of claim 16 wherein said fracturing fluids of steps (b) and (e) are each an aqueous acid solution.

18. The method of claim 17 wherein said acid in said solution is selected from the group of hydrochloric acid, hydrofluoric acid, formic acid, acetic acid, citric acid and mixtures thereof.

19. The method of claim 18 wherein said acid is present in said solution in an amount in the range of from about 1% to about 28% by weight of said solution.

* * * * *